United States Patent [19]

Marzocchi

[11] 3,862,882
[45] Jan. 28, 1975

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: Sept. 25, 1972

[21] Appl. No.: 292,025

[52] U.S. Cl. ................. 161/170, 117/72, 117/76 T, 117/126 GB, 117/126 GN, 161/176, 161/193, 260/37 EP, 260/42.15, 260/42.16, 260/42.18, 260/42.43, 260/42.47, 260/762, 152/361 R
[51] Int. Cl. ..... B32b 5/02, C03c 25/00, C08g 51/16
[58] Field of Search ........... 161/170, 172, 175, 176, 161/193; 117/126 GB, 126 GN, 72, 76 T; 260/557 H, DIG. 2, 42.15, 42.16, 42, 18, 42.43, 42.47

[56] References Cited
UNITED STATES PATENTS

| | | | |
|---|---|---|---|
| 3,143,405 | 8/1964 | Wong | 117/126.6 B X |
| 3,364,059 | 1/1968 | Marzocchi | 117/77 X |
| 3,773,607 | 11/1973 | Marzocchi | 117/72 X |

*Primary Examiner*—William J. Van Balen
*Assistant Examiner*—Lorraine T. Kendall
*Attorney, Agent, or Firm*—Carl G. Staelin; John W. Overman; Keith V. Rockey

[57] ABSTRACT

This invention is addressed to the improvement in the bonding relationship between glass fibers and elastomeric materials wherein glass fibers are treated with a composition containing an amine-amide group which can be converted on heating to an isocyanate group which is capable of reaction with elastomeric materials or a resorcinol-aldehyde resin component of an impregnant to establish a chemical bond therebetween to tie the glass fibers to an elastomer or an elastomer compatible impregnant containing a resorcinol-aldehyde resin component.

12 Claims, 3 Drawing Figures

PATENTED JAN 28 1975  3,862,882

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and-/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinous fibers are gathered together to form a silver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and EPDM rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alphamonoolefin having from 3–20 carbon atoms, such as propylene, and polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products, which is unique to glass fibers, is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems of bonding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords, chopped strands or fabrics, hereinafter referred to as bundles, containing an impregnant therein which also serves to intertie the glass fiber bundles to the elastomeric material in which the bundles are distributed.

It is an object of this invention to produce and provide a method for the preparation of treated glass fibers which can be securely integrated with elastomeric materials in the manufacture of glass fiber reinforced elastomeric products such as timing belts, drive belts, rubber tires and the like.

It is a more specific object of the present invention to produce and provide a method for producing treated glass fibers in which the individual glass fibers are coated with a composition capable of reaction with an impregnant applied to the glass fibers after the glass fibers have been formed into bundles to chemically bond the glass fiber surfaces to the impregnant in the bundle to facilitate the combination of the bundles with elastomeric materials.

It is a related object of the invention to provide treated glass fibers in which the individual glass fibers or bundles of glass fibers are impregnated with a composition which can be activated by heat, as during cure and/or vulcanization of the treated glass fibers in combination with elastomeric materials to cross-link and/or polymerize the composition on the glass fibers and simultaneously form a chemical bond between the treated glass fibers and an elastomeric material constituting a continuous phase in which the treated glass fibers are distributed.

These and other objects and advantages of the invention will appear more fully hereinafter, and, for purposes of illustration but not of limitation, an embodiment of the invention is shown in the accompanying drawing in which.

Figure 1:
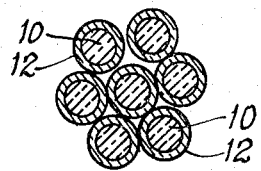
FIG. 1 is a cross-sectional view of glass fibers treated in accordance with one embodiment of the invention to individually coat the glass fibers.

The concepts of the present invention reside in the treatment of glass fibers with a composition containing a component having at least one amine-amide group of the formula

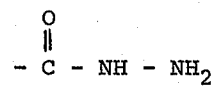

which can be converted, through the use of heat, to an isocyanate group

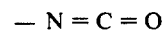

to form a chemical bond between the glass fiber surfaces and an elastomeric material.

In the preferred embodiment of the present invention, individual glass fibers are coated, preferably as they are formed, with a composition containing as an essential componennt an amine-amide. Thereafter, the glass fibers are formed into a strand, yarn, cord or fabric, generally referred to herein as a bundle, and the bundle is impregnated with an impregnant composition formulated to include a resorcinolaldehyde resin component and at least one elastomer component.

The impregnated bundle can then be subjected to an elevated temperature sufficient to convert the amine-amide group to an isocyanate, either prior to or simultaneously with cure and/or vulcanization of the impregnated bundle with an elastomeric material in the manufacture of glass fiber reinforced elastomeric products.

Without limiting the present invention as to theory, it is believed that the heating converts the amine-amide group to an isocyanate group according to the following

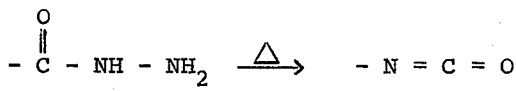

which in turn reacts with the alkylol groups present in the resorcinol-aldehyde resin matrix. For example, where the resin component of the impregnant is a resorcinol-formaldehyde, the resin matrix is known to contain methylol group distributed through matrix

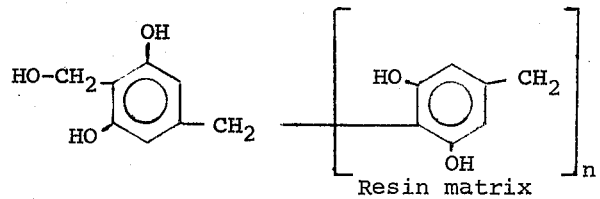

where the resin is prepared using two or more moles of aldehyde per mole of resorcinol.

It is accordingly believed that the isocyanate reacts with the methylol groups to form a methane linkage as follows:

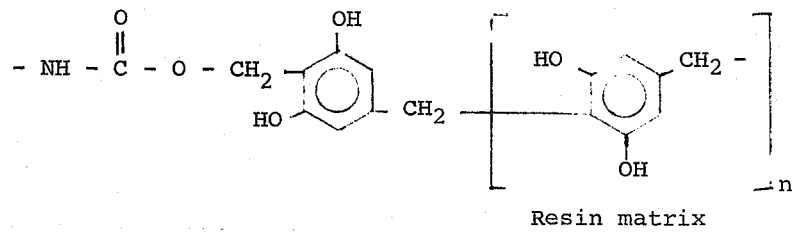

to bond the impregnant to the coating on the glass fibers.

Alternatively, glass fibers which have been coated with an amine-amide as described above can be combined directly with an elastomeric material, either before or after the amine-amide has been converted to the corresponding isocyanate. It is believed that elastomeric materials, such as natural and synthetic rubber, contain ionic groups which are capable of reaction with the isocyanate group to bond the glas fiber surfaces to the elastomeric material during the cure and/or vulcanization of the combination of the treated glass fibers and the elastomeric material.

In accordance with another embodiment of the invention, glass fibers are coated or bundles of glass fibers are impregnated, with a composition formulated to contain both the amine-amide and a combination of a resorcinol-aldehyde resin and an elastomer whereby the coated fibers or impregnated bundles can be subjected to an elevated temperature to convert the amine-amide at the desired time to the corresponding isocyanate and thereby cross-link the coating or impregnant on the glass fibers.

Instead of a resorcinol-aldehyde resin-elastomer blend, use can also be made of blends of polyepoxides, polyols or hydroxy containing polyesters alone or in combination. As long as the composition includes epoxide groups or groups containing labile hydrogen atoms, the composition is able to undergo cross-linking on the glass fiber surfaces with the isocyanate produced as a result of thermal decomposition of the amine-amide.

A variety of amine-amides can be used in the practice of the present invention. One group of amine-amides which are preferred are the diamine-amide derivatives of polycarboxylic acids containing 3 to 20 carbon atoms and 2 to 4 carboxyl groups.

Such amine-amides can be represented by the formula

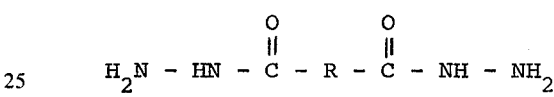

wherein R is a divalent organic group containing 1 to 18 carbon atoms, such as alkylene, alkenylene, arylene, etc. Representative are the amine-amide derivatives of succinic acid, pimelic acid, suberic acid, sebacic acid, glutaconic acid, etc.

As is well known to those skilled in the art, the foregoing amine-amides can be prepared by simply refluxing, in the presence of an inert solvent if desired, the acid or an alkyl ester derivative thereof with hydrazine.

In addition to the foregoing amine-amides, use can also be made of hydrazine derivatives of carboxyester silanes of the formula

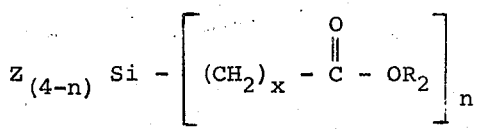

wherein Z is a readily hydrolyzable group, such as Cl or Br, or a lower alkoxy group (e.g., methoxy, ethoxy, propoxy, etc.), $n$ is an integer from 1 to 3, $x$ is an integer from 3 to 6 and $R_2$ is a lower alkyl (e.g., methyl, ethyl, isopropyl, etc.).

The reaction product formed by reaction of the above carboxy esters with hydrazine is a complex mixture of products depending on the relative proportions and whether the reaction is carried out in the presence of an aqueous medium or an inert organic solvent.

For example, where the reaction is carried out in an inert organic solvent, the reaction product includes a mixture of

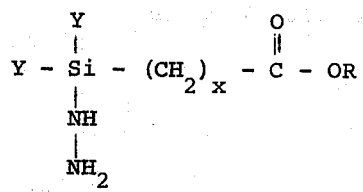

where Y is either —NH—NH₂ or Z,

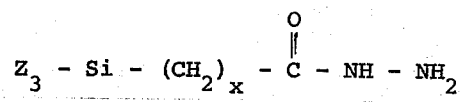

and

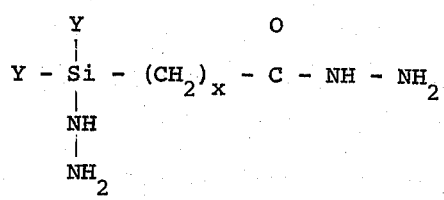

The above compounds, when placed in water, are susceptible to hydrolysis to form the corresponding silanols since both the —Z and —NH—NH₂ are hydrolyzable.

It is generally preferred that the reaction be carried out in aqueous media, and the silane is already in at least a partially hydrolyzed state to form predominantly the corresponding amine-amide derivatives above. Because of the activity of the hydrazine reactant, some —NH—NH₂ groups do become bonded to the silicon atom through an —O— group to form —O—NH—NH₂ groups, along with OH groups.

The reaction is preferably carried out using from 1 to 4 moles of hydrazine per mole of the silane at a relatively low temperature, generally a temperature of 0° to 50°C, although higher or lower temperatures can be used if desired.

Having described the basic concepts of the invention, reference is now made to the following examples which are provided by way of illustration and not by way of limitation, of the practice of the invention.

EXAMPLE 1

This example demonstrates the treatment of glass fibers with an amine-amide, and the subsequent impregnation of a bundle of treated glass fibers with an impregnant.

An amine-amide prepared from adipic acid and hydrazine having the formula

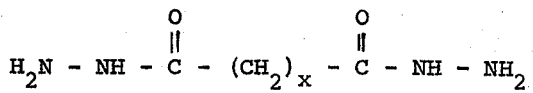

is formulated into the following treating composition:

| | |
|---|---|
| Amine-amide | 5.0 % by weight |
| Lubricant (Lauric acid amide - ethylene oxide condensate - Nopcogen 16L) | 1.0 % by weight |
| Water | 94.0 % by weight |

The glass fibers are wet with the above treating composition to form a thin film or coating on the individual glass fiber filaments in a conventional manner. The coated fibers are allowed to air dry, or, if desired, drying can be accelerated by exposure to an elevated temperature. It is necessary to limit the temperature of drying the glass fibers to a temperature below that at which the amine-amide is converted to the corresponding isocyanate.

As will be appreciated by those skilled in the art, the temperature at which the amine-amide is converted to the corresponding isocyanate depends somewhat on the nature of the amine-amide. Most of such amine-amides are converted to the corresponding isocyanate at temperatures above 130°C or higher. Drying temperatures in excess of 130°C should therefore be avoided; otherwise, the amine-amide would be converted to the corresponding isocyanate which would be decomposed when the treated glass fibers are contacted with aqueous impregnating compositions.

The applied composition forms a coating 12 on the individual glass fibers 10 wherein the coating contains the amine-amide, as shown in FIG. 1. While it is not necessary to the practice of the invention, the coating composition can also be formulated to contain a conventional glass fiber lubricant as illustrated in this example to impart lubricity to the glass fibers for subsequent processing.

The glass fibers coated with the amine-amide are then gathered together to form a bundle of fibers in the form of a strand or two or more strands which are plied together and twisted to form yarns, cords or threads, or to form woven or non-woven fabrics.

After the fibers coated with the amine-amide have been formed into bundles, the bundles are impregnated with an impregnating composition formulated to contain a resorcinol-aldehyde resin and an elastomer latex, such as the following:

Impregnating Composition

| | Parts by Weight |
|---|---|
| Resorcinol-formaldehyde resin | 2-10 |
| Vinyl pyridine-butadiene-styrene terpolymer rubber | 15-50 |

Water constitutes the balance of the composition, and the amount of water is adjusted to provide an aqueous impregnating composition having a solids content of 20 to 55% by weight dry solids.

Impregnation of a bundle of glass fibers in which the filaments contain a thin coating of the foregoing amine-amide can be made by conventional means for impregnation, such as by immersion of the bundles in a bath of the aqueous impregnating composition.

Figure 2:
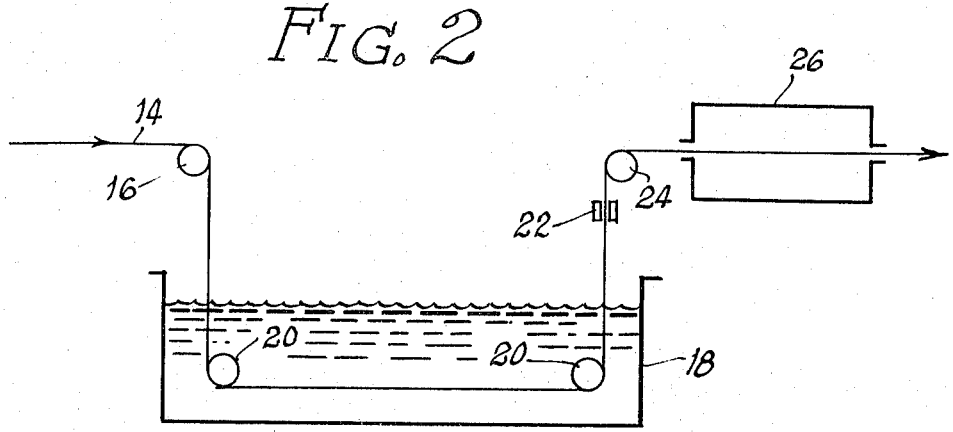
FIG. 2 is a schematic flow diagram illustrating the subsequent treatment of glass fibers which have been formed into bundles for impregnation of the glass fiber bundles.

Referring more specifically to FIG. 2 of the drawing, the glass fiber bundle 14 is advanced over a guide roller 16 for passage downwardly into the bath 18 containing the above impregnating composition. The bundle is then turned under rollers 20 to effect a sharp bend which operates to open the bundle to enable more complete penetration of the aqueous impregnating composition into the bundle of coated fibers for complete impregnation of the bundle. The impregnated bundle is then raised from the bath for passage through a roller or die 22 which operates to remove excess impregnating composition from the bundle and to work the impregnating composition into the bundle.

Thereafter, the endless bundle is advanced over a roller 24 for passage through a drying oven 26, such as a dielectric, microwave, hot gas or radiant oven maintained at a temperature sufficient to convert the amine-amide to the corresponding isocyanate for reaction with at least the resorcinol-aldehyde component of the impregnant and to accelerate removal of the aqueous diluent and set the impregnant in situ in the glass fiber bundle.

It is generally preferred that the drying oven be maintained at a temperature of 150° to 300°C. The time for drying of the impregnant and for conversion of the amine-amide to the corresponding isocyanate is not critical and generally ranges from 0.1 to 30 minutes, depending on the drying temperature. However, if desired, drying can be carried out at a temperature below the temperature at which the amine-amide is converted to the corresponding isocyanate. In this embodiment, the impregnated bundle with the amine-amide present as a coating on the individual glass fibers can be combined with elastomeric materials in the manufacture of glass fiber-reinforced elastomeric products, and the amine-amide is converted to the corresponding isocyanate when the combination of the impregnated bundle and the elastomer constituting the continuous phase of the elastomeric product is subjected to cure and/or vulcanization.

Figure 3:
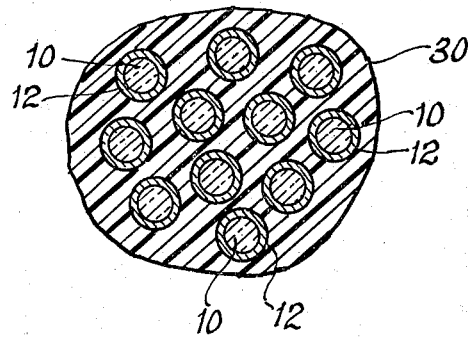
FIG. 3 is a cross-sectional view of glass fibers treated in accordance with the method illustrated in FIG. 2.

The resulting bundle is shown in FIG. 3, and is formed of a plurality of glass fibers 10 having the thin film 12 containing either the amine-amide or the corresponding isocyanate, depending on the temperature of drying of the bundle. The impregnant 30 serves to completely penetrate the bundle and separate the fibers each from the other to provide protection of the individual glass fiber filaments from destruction by mutual abrasion.

The resorcinol-formaldehyde resin component of the impregnating composition of Example 1 can be any of a number of resins prepared with a mole ratio of aldehyde to resorcinol above 2. Such resins are commercially available from, for example, Koppers Company under the trademark "Penacolite." Suitable vinyl pyridine butadiene-styrene terpolymers are similarly commercially available; representatives include the "Gentac" terpolymers from General Tire and Rubber Company and "Pholite VP 100" from Goodyear Tire and Rubber Company. Blends of such materials are also commercially available and include the blends marketed by U.S. Rubber Company under the trademark "Lotol."

As will be appreciated by those skilled in the art, numerous impregnating compositions formulated to contain a resorcinolaldehyde resin component and an elastomer component can be used in the practice of the present invention. One such composition is described in U.S. Pat. No. 3,567,671 and its use can be illustrated by way of the following example:

EXAMPLE 2

An amine-amide derived from pimelic acid and having the formula

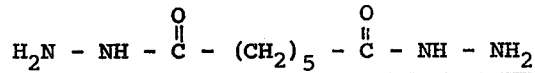

is formulated into the following treating composition:

| Amine-amide | 8.0 % by weight |
| Lubricant | 1.0 % by weight |
| Water | 91.0 % by weight |

The foregoing composition is applied as a thin coating on glass fibers as described in Example 1 and the coating dried. A bundle of glass fibers having the coating on the surfaces of the individual glass fibers is then subjected to impregnation with the following impregnating composition as described in U.S. Pat. No. 3,567,671:

Impregnating Composition

| | Parts by weight |
|---|---|
| Resorcinol-formaldehyde resin (Penacolite R 2170) | 4.0 |
| Vinyl pyridine-butadiene-styrene terpolymer | 30.0 |
| Vinyl chloride-vinylidene chloride copolymer | 15.0 |
| Microcrystalline paraffin wax | 4.0 |

Water constitutes the balance of the composition and is present in an amount to adjust the solids content of the impregnating composition to within the range of 25 to 55 percent solids by weight. Application of this impregnating composition can be made in accordance with the procedure of Example 1 to deposit in the bundle any solids constituting 5 to 30 percent by weight of the glass fiber system.

As in Example 1, the bundle can be dried at a temperature above or below the temperature at which the amine-amide is converted to the corresponding isocyanate.

Numerous impregnating compositions can also be used in the practice of this invention, including the compositions described in U.S. Pat. Nos. 3,424,608 and 3,591,357.

EXAMPLE 3

This example illustrates the use of an amine-amide prepared by reaction of a carboxy silane ester with hydrazine.

The methyl ester of gamma-carboxypropyltrimethoxysilane prepared by esterification of the carboxy silane described in U.S. Pat. No. 3,169,884 is dispersed in water, and hydrazine is added at room temperature in a mole ratio of 3.5 moles of hydrazine per mole of the silane. The resulting mixture is then allowed to stand for 3 hours; the mixture is believed to contain

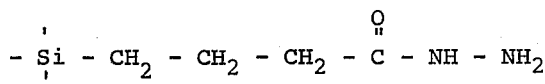

in a hydrolyzed state.

The solution is then diluted with water to form the following treating composition:

| Amine-amide silane | 4.0% by weight |
| Water | 96.0% by weight |

The treating composition is then applied to glass fibers as described in Example 1 to form a thin film on the individual glass fiber surfaces. A bundle of the coated glass fibers is then impregnated with the impregnating composition described in Example 2.

The bundle can then be dried at a temperature above about 145°C to convert the amine-amide group to the corresponding isocyanate group for reaction with the resorcinol-formaldehyde resin component of the impregnant, or at lower temperature whereby conversion of the amine-amide to the corresponding isocyanate

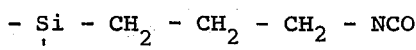

can be achieved on cure and/or vulcanization of the impregnated bundle in combination with an elastomeric material in the manufacture of glass fiber reinforced elastomeric products.

EXAMPLE 4

Glass fibers are treated with the amine-amide treating composition of Example 1 to form a thin film coating on the glass fibers which constitute from 0.1 to 5 percent by weight of the glass fibers.

After drying at a temperature of about 110°C, the treated glass fibers are formed into bundles and the bundles subjected to impregnation using the procedure described in Example 1 with the following composition:

Impregnating Composition

|  | Parts by weight |
|---|---|
| Resorcinol-formaldehyde resin | 5.0 |
| Polyepoxide resin (Epon-Dow) | 3.0 |
| Vinyl pyridine-butadiene-styrene terpolymer rubber | 30.0 |
| Water to solids content of 35% by weight | |

The impregnated bundle is dried at a temperature of 200°C to convert the amine-amide to the corresponding diisocyanate for reaction with the resorcinol-formaldehyde and the polyepoxide resins to cross link the impregnant on the glass fiber surfaces.

The polyepoxide employed in this example is a polyepoxide formed by reaction of bis-phenol A and epichlorohydrin which is commercially available from the Dow Chemical Company. Various other polyepoxides well known to those skilled in the art can similarly be employed in combination with or in lieu of the resorcinol-aldehyde resin component. For example, use can be made of epoxidized polybutadiene which exhibits good compatibility with the resorcinol-aldehyde resin and the elastomer components of such impregnating composition.

In addition, use can also be made of hydroxyl containing polyesters including those prepared by reaction of polycarboxylic acids and polyols (e.g., alkylene glycols, sorbitol, trimethyol propane, etc.) which contain free hydroxy groups for reaction with the isocyanate formed by thermal decomposition of the amine amide.

When such reactive materials are employed in combination with a resorcinol-aldehyde resin, the polyepoxides and/or hydroxyl containing polymers generally are present in an amount within the range of 0.1 to 1 part by weight per part by weight of resorcinol-aldehyde resin on a solids basis.

As indicated above, glass fibers coated with an amine-amide can be directly combined with elastomeric materials in the manufacture of glass fiber reinforced elastomeric products without impregnation. In the combination of the individually coated glass fibers with such elastomeric materials, the glass fibers can be in the form of continuous filaments or in the form of filaments which have been chopped to shorter lengths (e.g., 0.1 to 2.0 inches). It has been found that elastomeric materials reinforced with chopped glass fiber filaments which have been treated with an amine-amide in the practice of this invention are particularly well suited for use as tread stock in rubber tires.

The following examples will serve to illustrate this concept of the invention.

EXAMPLE 5

Using the procedure described in Example 1, the di(amine-amide) of adipic acid described in Example 1 is formulated into the following treating composition:

| Amine-amide | 6 % by weight |
|---|---|
| Water | 94 % by weight | and coated on individual glass fiber filaments. The coated fibers are then dried at a temperature of 100°C and chopped to lengths of from 0.25 to 1.0 inches.

The coated and chopped fibers are then combined with neoprene rubber in an amount of about 15 percent glass fibers based on the total weight of the rubber. The combination of the chopped glass fibers and the rubber is blended to uniformly disperse the chopped fibers throughout the neoprene rubber which constitutes a continuous phase. The combination is formed into sheets and vulcanized in a conventional manner at a temperature of about 200°C to advance the neoprene rubber to a cured and/or vulcanized stage and to convert the amine-amide to the corresponding isocyanate for reaction with the rubber to securely anchor the glass fibers to the rubber.

It has also been found according to the invention that the bonding relationship between the glass fibers and elastomeric materials can be further improved by formulating the continuous phase elastomeric material with a low molecular weight alkanolyl donor, a low molecular weight epoxide resin or a low molecular weight hydroxy-containing polyester. It is believed that the amine-amide is thus reactive with the alkanolyl donor, epoxy or a polyester dispersed throughout the elastomeric material.

Suitable alkanolyl donors which can be employed include the compounds and mixtures thereof prepared by reaction of a lower aldehyde (e.g., formaldehyde, acetaldehyde, propionaldehyde, etc.) with resorcinol, urea or melamine as described in my copending application Ser. No. 99,792, filed Dec. 21, 1970.

Epoxide resins which can be formulated into the continuous rubber phase include normally liquid epoxides prepared by reaction of an epihalohydrin such as epichlorohydrin with a polyhydric phenol (e.g., bis-phenol A, resorcinol, hydroquinone, etc.) or a polyhydric alcohol (e.g., alkylene glycols, glycerol, polyalkylene glycols, etc.) as well as epoxidized oils and epoxidized triglyceride esters, such as epoxidized soya oil. Similarly, the rubber constituting the continuous phase can be formulated to include normally liquid polyesters containing free OH groups.

In practice, from 1 to 60 parts by weight of at least one of the foregoing alkylol donors, epoxides or polyesters is uniformly blended with 100 parts by weight of the elastomer. Thereafter, the glass fibers are treated in accordance with Examples 5 or 6. The resulting combination of modified elastomer and glass fibers can then be subjected to cure and/or vulcanization to advance the elastomeric material to a cured or vulcanized state, and simultaneously convert the amine-amide to the corresponding isocyanate for reaction with the alkylol donor, epoxide or polyester to establish a secure bonding relationship between the glass fibers and the elastomer.

EXAMPLE 6

Using the procedure described in Example 3, the methyl ester of gamma-carboxypropyltriethoxy silane is reacted with hydrazine in a mole ratio of 4 moles of hydrazine per mole of silane in the presence of toluene as a solvent.

The resulting product is then separated from the toluene and dispersed in water to form the following treating composition:

| | |
|---|---|
| Silane reaction product | 3.5% by weight |
| Water | 96.5% by weight |

The foregoing treating composition is applied to glass fibers to form a thin film coating, and the coating allowed to air dry. The fibers are then laid down in the desired arrangement with isoprene rubber and the combination is vulcanized to convert the silane reaction product which is believed to contain the group

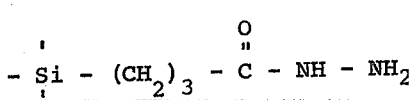

in hydrolyzed form to the corresponding isocyanate

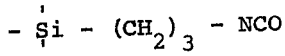

for reaction with the rubber.

As will be appreciated by those skilled in the art, glass fibers which have been treated in accordance with the procedures described in Examples 4 and 5 can be dried at an elevated temperature sufficient to convert the amine-amide to the corresponding isocyanate prior to combination of the treated fibers with elastomeric materials whereby the isocyanate groups in the coating are available for reaction with the elastomeric material during cure and/or vulcanization of the elastomeric material.

In accordance with another embodiment of the invention, the amine-amide is formulated into an impregnating composition containing a resorcinol-aldehyde resin component and an elastomer component for use in the treatment of glass fiber bundles. In the preferred practice of this concept of the invention, the individual glass fibers forming such bundles are first coated with an organo silicon compound which contains a functional group having at least one labile hydrogen atom or which contains an epoxy group.

Suitable functional groups include amino, hydroxy or mercapto groups, all of which are capable of undergoing reaction with an isocyanate group. Without limiting the present invention as to theory, it is believed that the organo silicon compound, which may be illustrated by the formula $$Z_{(4-n)} Si - (CH_2)_x - X - H$$

wherein Z, n and x have the meaning described above and X is —O—, —S— or —NH—, becomes bonded to the glass fiber surfaces as follows:

When the bundles of glass fibers which are impregnated with the impregnating composition containing the amine-amide, the resorcinol-aldehyde resin and the elastomer components are subjected to an elevated temperature to convert the amine-amide to the corresponding isocyanate, it is believed that the isocyanate is capable of reaction with both the functional group of the organo silicon compound on the glass fiber surface and the resorcinol-aldehyde resin component of the impregnant to bond the impregnant to the glass fiber surfaces through chemical bonds illustrated by the following:

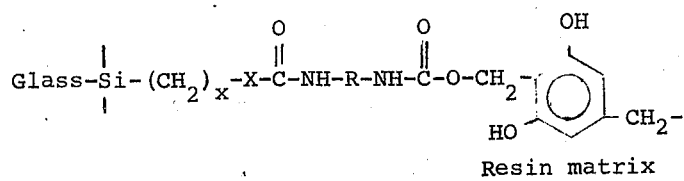

Resin matrix

Thus, the amine-amide is capable of providing a chemical bond between the anchoring agent on the glass fiber surface and the resorcinol-aldehyde resin component of the impregnant to securely tie the impregnant to the glass fiber surfaces.

A similar mechanism is believed to be applicable when the functional group of the organo silicon compound is an epoxy group. Thus, using glycidoxytrimethoxy silane as illustrative, the chemical bonds established are believed to be the following:

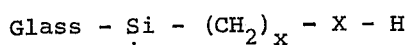

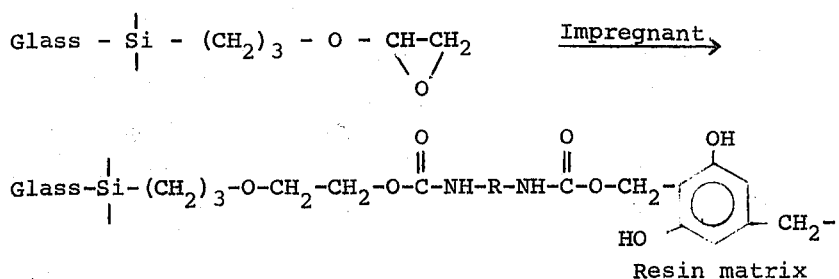

Resin matrix

As the organo silicon compound contained in the coating on the individual glass fibers, use is preferably made of an organo silane of the formula $$Z_{(4-n)} Si(R_3)_n$$

wherein Z and n are as described above and $R_3$ is an organic group containing 2 to 12 carbon atoms substituted by one or more of an amino group, an epoxy group, a hydroxy group or a mercapto group as described above. In addition to the above silanes, use can also be made of the corresponding hydrolysis products (i.e., silanols) or the corresponding polymerization products (i.e., siloxanes) derived from the foregoing silanes.

The organic group of the above can be one of a number of such groups well known in the art of organo silicon compounds. For example, $R_3$ can be an alkyl group containing 2 to 12 carbon atoms (e.g., ethyl, propyl, butyl, etc.), an alkenyl group containing 2 to 12 carbon atoms (e.g., vinyl, allyl, etc.), a cycloalkyl group containing 4 to 8 carbon atoms (e.g., cyclobutyl, cyclopentyl, cyclohexyl, etc.), which are substituted by one or more of the above groups.

Representative silanes include gamma-aminopropyltriethoxy silane, delta-aminobutyltrimethoxy silane, beta-aminovinyltrimethoxy silane, p-aminophenyltrimethoxy silane, gamma-aminoallyltrimethoxy silane, 3,4-epoxycyclohexylethyltrimethoxy silane, 3,4-epoxybutyltrimethoxy silane, gamma-mercaptopropyltrimethoxy silane, delta-mercaptobutyltriethoxy silane, gamma-hydroxypropyltrimethoxy silane, p-hydroxyphenyltrimethoxy silane as well as others known to those skilled in the art.

This concept of the invention may be illustrated by the following examples:

EXAMPLE 7

Using conventional procedures as described in U.S. Pat. No. 3,428,608, glass fibers are individually coated with the following size composition:

Size Composition

| | |
|---|---|
| Gamma-aminopropyltriethoxy silane | 2.0% by weight |
| Lubricant | 0.5% by weight |
| Water | 97.5% by weight | to form a thin film coating 12 on the individual glass fibers 10 as shown in FIG. 3.

Thereafter, using the procedure described in Example 1, bundles of glass fibers which have been sized with the above composition are subjected to impregnation with the following impregnating composition:

Impregnating Composition

| | |
|---|---|
| Resorcinol-formaldehyde resin | 20 % by weight |
| Vinylpyridine-butadiene-styrene terpolymer | 75 % by weight |
| Amine-amide of adipic acid | 5 % by weight |

Water constitutes the balance of the composition and is present in an amount to adjust the total solids content to within the desired range described above.

The impregnated bundle is thereafter dried at a temperature of 200°C to convert the amine-amide to the corresponding diisocyanate for reaction with the amino group of the amino silane and the methylol groups of the resorcinol-formaldehyde resin component of the impregnant 30 (see FIG. 3).

EXAMPLE 8

Using the procedure described in Example 6, glass fibers are sized with the following:

| | |
|---|---|
| Mercaptopropyltrimethoxy silane | 5 % by weight |
| Water | 95 % by weight |

Thereafter, the sized glass fibers are formed into bundles which are impregnated with the following composition:

Impregnating Composition

| | Parts by weight |
|---|---|
| Resorcinol-formaldehyde resin | 4.0 |
| Vinyl pyridine-butadiene-styrene terpolymer | 30.0 |
| Carboxylated butadiene-styrene copolymer resin | 15.0 |
| Microcrystalline paraffin wax | 4.0 |
| Amine-amide of adipic acid | 3.0 |
| Water to solids content of 25–55% by weight | |

The bundle impregnated with the foregoing impregnant is then dried at an elevated temperature to convert the amine-amide to the corresponding diisocyanate for reaction with the mercapto group of the silane and the resorcinol-formaldehyde resin component of the size. If desired, the bundle can be dried at a temperature lower than the temperature at which the amine-amide is converted to the corresponding isocyanate; thus, the conversion of the amine-amide to the isocyanate takes place during cure and/or vulcanization of the impregnated bundle in combination with an elastomeric material constituting the continuous phase of a glass fiber-reinforced elastomeric product.

In formulating impregnating compositions of the type used in Examples 7 and 8, the amount of the amine-amide can be varied within wide limits. Generally, an amount of amine-amide of 0.1 to 2 parts by weight per part by weight of resorcinol-formaldehyde resin provides best results.

EXAMPLE 9

Again using the procedure described in Example 6, glass fibers are sized with the following Size Composition

| | |
|---|---|
| Gamma-hydroxypropyltrimethoxy silane | 3.0 % by weight |
| Lubricant | 0.5 % by weight |
| Water | 96.5 % by weight |

Thereafter, the glass fibers are formed into bundles which are impregnated with the following composition:

Impregnating Composition

| | Parts by weight |
|---|---|
| Resorcinol-formaldehyde resin | 5.0 |
| Natural rubber latex | 15.0 |
| Amine-amide of sebacic acid | 4.0 |
| Water to solids content of 35% by weight | |

In facilitating the combination of glass fibers treated in accordance with the present invention with elastomeric materials, the individual glass fibers containing a coating on the surfaces thereof or bundles of glass fibers containing an impregnant therein are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined constitutes a continuous phase. Such continuous phase elastomeric materials may comprise elastomers or rubbers on the type incorporated into the treating composition or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

I claim:

1. A glass fiber bundle comprising a plurality of glass fibers, and an impregnant in the bundle, said impregnant comprising a blend of (1) an amine-amide having the formula

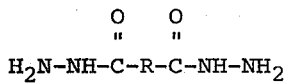

wherein R is a divalent organic group containing 1 to 18 carbon atoms, (2) a resorcinol-aldehyde resin and (3) at least one elastomer.

2. A bundle as defined in claim 1 wherein the individual glass fibers forming the bundle have a thin coating on the surfaces thereof, said coating containing an organo silicon compound in which the organic group is substituted by at least one group selected from the group consisting of an epoxy group and a group containing at least one labile hydrogen atom.

3. A bundle as defined in claim 2, wherein the group is a group containing a labile hydrogen atom and is selected from the group consisting of an amino group, a hydroxy group and a mercapto group.

4. A bundle as defined in claim 2 wherein the organo silicon compound is an organo silane having the formula $$Z_{(4-n)} Si(R_3)_n$$

wherein Z is a readily hydrolyzable group, $n$ is an integer from 1 to 3 and $R_3$ is an organic group substituted by a group selected from the group consisting of an amino group, a hydroxy group, a mercapto group and an epoxy group, their corresponding silanols and polysiloxanes.

5. A bundle as defined in claim 1 wherein the amine-amide has been converted to the corresponding polyisocyanate.

6. In a glass fiber reinforced elastomeric product wherein an elastomeric material constitutes a continuous phase in which the glass fibers are distributed, the improvement in the bonding relationship between the glass fibers and the elastomeric material constituting the continuous phase comprising a bundle formed of a plurality of glass fibers, and an impregnant in the bundle, said impregnant comprising a blend of (1) an amine-amide having the formula

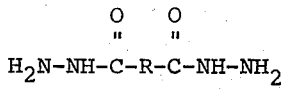

wherein R is a divalent organic group containing 1 to 18 carbon atoms, (2) a resorcinol-aldehyde resin and (3) at least one elastomer.

7. A product as defined in claim 6 wherein the individual glass fibers forming the bundle have a thin coating on the surfaces thereof, said coating containing an organo silicon compound in which the organic group is substituted by at least one group selected from the group consisting of an epoxy group and a group containing at least one labile hydrogen atom.

8. A product as defined in claim 7 wherein the organo silicon compound is an organo silane having the formula $$Z_{(4-n)} Si(R_3)_n$$

wherein Z is a readily hydrolyzable group, $n$ is an integer from 1 to 3 and $R_3$ is an organic group substituted by a group selected from the group consisting of an amino group, a hydroxy group, a mercapto group and an epoxy group, their corresponding silanols and polysiloxanes.

9. A product as defined in claim 7 wherein the amine-amide has been converted by heating to the corresponding polyisocyanate.

10. In the method for the manufacture of glass fiber-reinforced elastomeric products wherein an elastomeric material constitutes a continuous phase in which the glass fibers are distributed, the improvement in the bonding relationship between glass fibers and the elastomeric material constituting a continuous phase comprising coating the individual glass fibers with an organo silicon compound containing a group selected from the group consisting of an epoxy group and a group containing at least one labile hydrogen atom, forming the coated glass fibers into a bundle, impregnating the bundle with an aqueous composition containing (1) an amine-amide having the formula

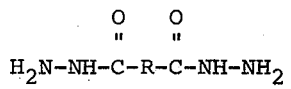

wherein R is a divalent organic group containing 1 to 18 carbon atoms, (2) a resorcinol-aldehyde resin and (3) an elastomer latex, and drying the bundle.

11. The method as defined in claim 10 wherein the bundle is dried at a temperature sufficient to convert the amine-amide to the corresponding polyisocyanate.

12. The method as defined in claim 10 wherein the bundle is dried at a temperature below the temperature at which the amine-amide is converted to the corresponding polyisocyanate, and the method includes the steps of combining the bundles with an elastomeric material constituting a continuous phase and vulcanizing the resulting combination at a temperature sufficient to convert the amine-amide to the corresponding polyisocyanate.

* * * * *